Oct. 18, 1960    J. R. WRIGHT    2,956,844
THRUST BEARING
Filed Oct. 14, 1957

INVENTOR.
JOHN R. WRIGHT
BY
ATTORNEYS

United States Patent Office 2,956,844
Patented Oct. 18, 1960

2,956,844

THRUST BEARING

John R. Wright, Watseka, Ill., assignor to Radio Condenser Company, Camden, N.J., a corporation of New Jersey Filed Oct. 14, 1957, Ser. No. 690,008

4 Claims. (Cl. 308—233)

This invention relates to a shaft mounting and has particular reference to a mounting suitable for variable condensers.

Various special requirements are involved in the mounting of shafts of variable condensers used in radio and other electronic apparatus. Generally, and particularly in miniature sizes of these condensers, spacings of the rotor and stator plates are quite small and yet the spacings must be uniform throughout the full range of rotation to provide the necessary insulation of the two sets of plates and uniformity of capacity variation so that tracking may be accomplished in associated circuits such as those involved in superheterodyne receivers. It is accordingly essential that the axial position of the rotor shaft should be quite precisely maintained. Furthermore, it is required that while there should be a substantial amount of frictional resistance to the turning of the shaft, its movement must be quite smooth since in tuning operations minute angular movements may represent quite large variations in tuning particularly in apparatus operating at quite high frequencies.

Heretofore it has been customary to mount one end of the shaft in a ball-bearing arrangement and at the other end to provide a thrust bearing in the form of a ball seated in a socket in the shaft and in a socket in the condenser frame, the latter being provided by a circular drilled or punched hole. The ball then had theoretically a line engagement with the edge of the hole, but any deviations from a perfectly circular edge would mean more or less indefinite positioning of the ball and hence of the shaft axis, with possible shifting of the ball during shaft rotation. Considerable friction also existed in this case and while friction alone would not be objectionable, the friction could vary during rotation so that movement would be quite likely to occur in small angular jumps of the shaft. Furthermore, because of the essentially line contact lubrication was generally inadequate.

It is the general object of the present invention to provide a thrust bearing particularly suitable for variable condensers in which a ball similar to that heretofore involved is seated in a trihedral socket of such size that the spherical surface of the ball will have tangential contacts with the three surface planes of the trihedral socket. Contact thus takes place at three points but with smooth surface contact and with possibility of adequate lubrication by the provision of suitable grease in the socket. As use occurs the ball will move about to distribute the lubricant. Because of the three point contact, furthermore, the position of the ball is definitely determined and maintained throughout the full range of movement of the rotor shaft. The arrangement has, at the same time, all of the advantages of the construction heretofore used.

The general object of the invention is the attainment of the results just indicated, and this as well as other objects relating to details, will become apparent from the following description, read in conjunction with the accompanying drawing in which.

Figure 1:
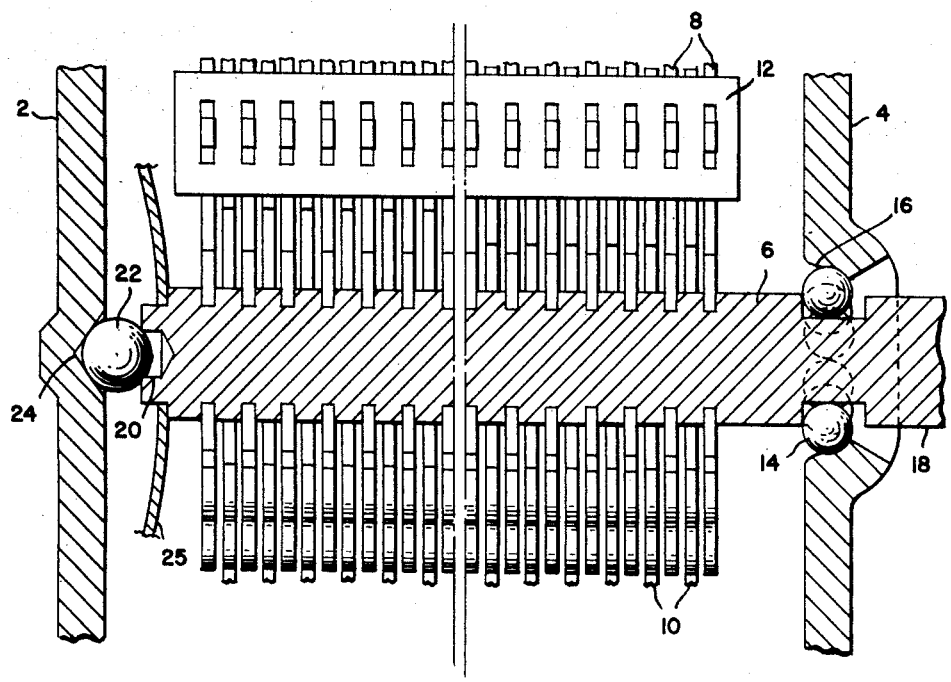
Figure 1 is a fragmentary axial section through a variable condenser embodying the invention, the section at the thrust bearing socket being taken on the broken plane indicated at 1—1 in Figure 2.

At 2 and 4 there are indicated plate portions of a variable condenser between which the rotor and stator assembly is mounted. These plate portions in small size condensers may be the legs of a U-shaped frame formed of metal and capable of springing slightly to make possible assembly and also to provide axial compression on the rotor shaft to furnish freedom against axial displacement and the desired friction to hold the rotor in an adjusted position. In other larger condensers the frame may be built up of separate elements bolted or otherwise secured together, and spring action on the rotor shaft may be effected otherwise than by springing of the frame. The movable plates 8 are carried by the shaft 6 and are interleaved with the stator plates 10 in conventional fashion. The rotor plates are shown as held spaced at their outer portions by insertion in slots in a strip 12 of substantially rigid insulating material. Structure features other than those shown are not exhibited since they may be entirely conventional.

A ball-bearing arrangement comprises the balls 14 held in a circular raceway 16 provided by limited extrusion of the plate and resting in a groove in the shaft 6 to provide a thrust bearing from which there extends outwardly the actuating portion 18 of the shaft. This is a conventional front bearing arrangement for condensers of this type.

Figure 2:
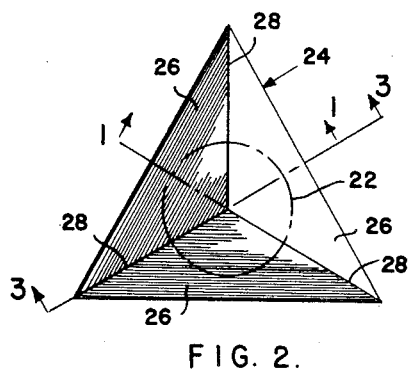
Figure 2 is a diagrammatic view looking into the improved socket provided in accordance with the invention, and illustrative of the nature of the bearing.
Figure 3:
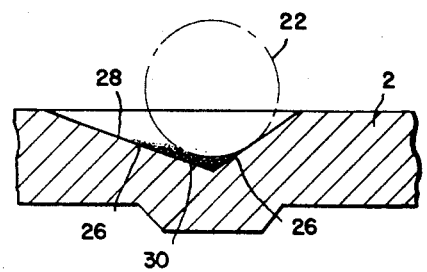
Figure 3 is a section taken on the plane indicated at 3—3 in Figure 2.

The invention is primarily concerned with the thrust bearing at what may be called the rear end of the shaft. At this end the shaft is provided with a socket 20 which may be semispherical, cylindrical or conical, the socket being aligned with the shaft axis. A ball 22 is seated in this socket and in a depression 24 provided in the plate 2. Heretofore the depression 24 has been generally provided merely by a drilled hole in the plate smaller in diameter than the ball. In accordance with the invention a considerable improvement is secured by forming the depression, as by punching, in the fashion illustrated in Figures 2 and 3.

The depression takes the form of a trihedral angle having three plane faces 26 meeting at the edges 28. Desirably the arrangement is centrally symmetrical, with the edges equiangularly spaced about the central axis of the angle. The angle which the faces make with each other is not particularly critical, so long as the trihedral angle is not so "sharp" as to produce too great a wedging action with resultant excessive friction. For example, it has been found highly satisfactory to provide a trihedral angle in which each plane face makes an angle of about 55° with respect to the central axis. The trihedral angle may correspond to the corner of a cube, the plane faces 26 then being mutually at right angles. For a given diameter of the ball 22, the depression must be sufficiently deep so that the ball makes tangential contacts with the faces 26.

Under the foregoing conditions, a very smoothly acting thrust bearing is provided while at the same time there is ample friction to retain the rotor in adjusted position against disturbance by vibration. Due to the three point tangential contact between the ball and the socket faces, the position of the ball remains accurately fixed despite rotary movements imparted to the ball upon rotation of the shaft. Thus the axis of the shaft is maintained fixed, this in turn meaning that the space relationships between the fixed and movable plates remain constant.

The arrangement also lends itself very well to lubrication since grease as indicated at 30 may be located in the socket depression and as the ball moves during use of the condenser this grease will be distributed to provide uniform lubrication. In view of the use of lubrication it is desirable to provide a good electrical contact with the shaft in conventional fashion by providing a bowed spring 25 in sliding engagement with a shoulder on the shaft.

While the socket has been described as provided in the plate 2, it will be evident that the socket in the shaft at 20 may be of this same type. Or, alternatively, the improved socket may be provided only in the shaft.

It will be clear that various changes may be made in the embodiment of the invention without departing from its scope as defined in the following claims.

What is claimed is:

1. A thrust bearing arrangement comprising a pair of members arranged for relative rotary motion, a spherical ball, and seats in said members for reception of said ball, the seat in at least one of said members being provided by a trihedral depression therein having substantially plane faces arranged to make three point tangential contact with said ball and symmetrically disposed about the axis of said relative rotary motion.

2. An arrangement according to claim 1 in which each of said plane faces makes an angle of approximately 55° with the axis of said relative rotary motion.

3. An arrangement according to claim 1 in which the apex of said trihedral depression is closed for the maintenance of lubricant therein.

4. A bearing arrangement comprising a rotatable shaft and means supporting one end of said shaft for rotary movement about the axis thereof, said supporting means including a member fixedly positioned adjacent said one end of said shaft, a spherical ball, a seat in said one end of said rotatable shaft, and a seat in said member, said seats being constructed to receive said ball therein, at least one of said seats being formed by a trihedral depression having substantially plane faces arranged to make three point tangential contact with said ball and symmetrically disposed about the axis of rotation of said shaft.

References Cited in the file of this patent

UNITED STATES PATENTS

| 442,357 | Cooke | Dec. 9, 1890 |
| 640,009 | Mittinger | Dec. 26, 1899 |
| 1,493,999 | Lombardi | May 13, 1924 |
| 1,895,540 | Cohen | Jan. 31, 1933 |
| 1,907,792 | Greenleaf | May 9, 1933 |
| 2,180,853 | Scheppmann | Nov. 21, 1939 |
| 2,645,078 | Bulova | July 14, 1953 |

FOREIGN PATENTS

| 302,442 | Switzerland | Dec. 16, 1954 |